Dec. 23, 1952   E. A. MOSES   2,622,890
SWINGING DRAWBAR HITCH AND STANDARDIZING UNIT
Filed Aug. 24, 1951   2 SHEETS—SHEET 2
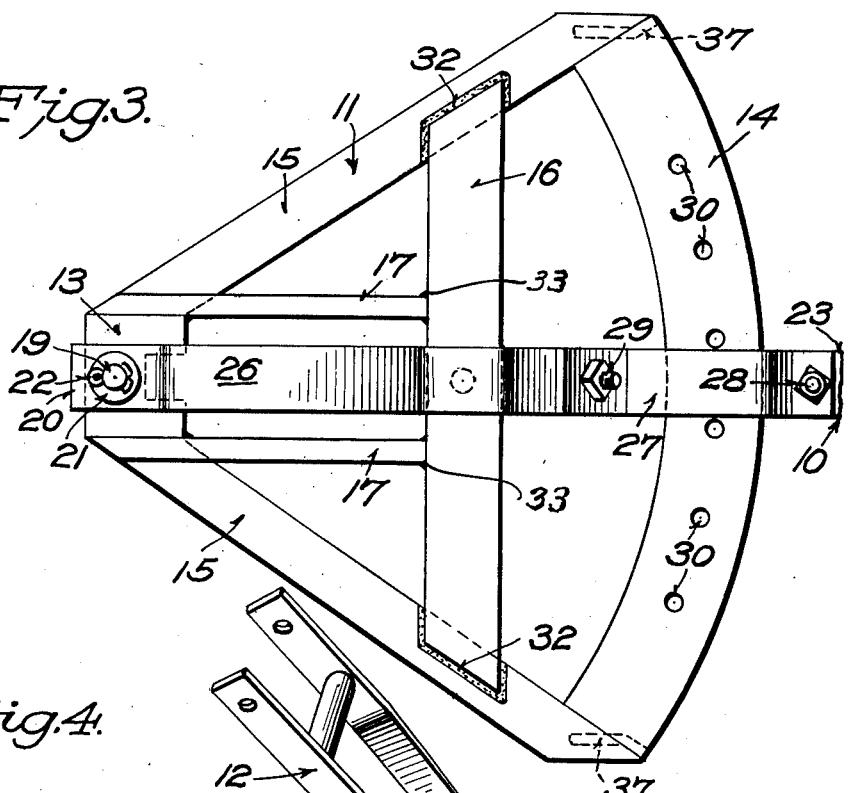
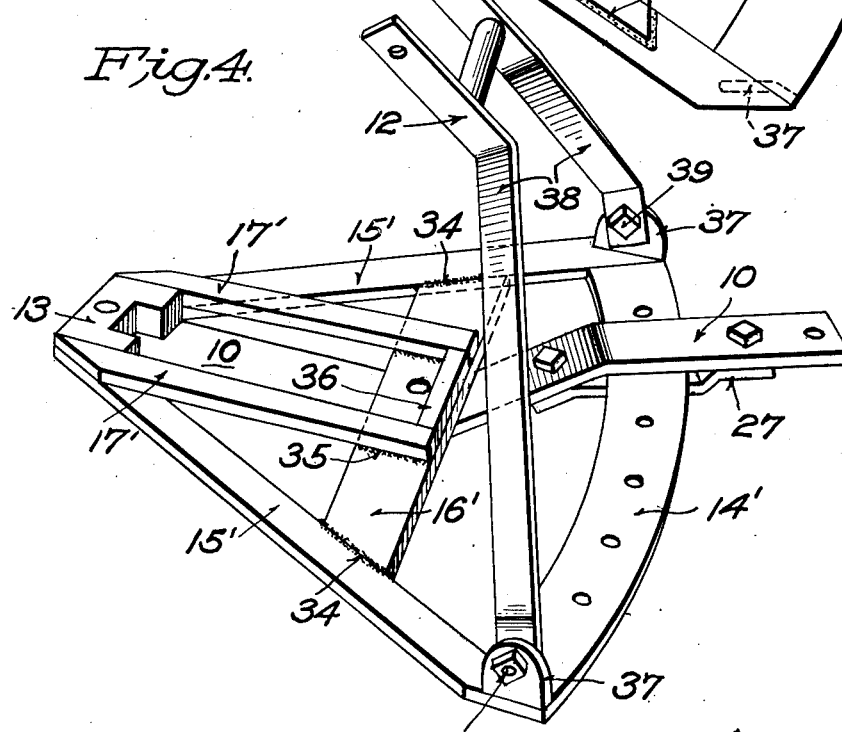
INVENTOR
ELMER A. MOSES,
BY H. B. Willson & Co.
ATTORNEY Patented Dec. 23, 1952

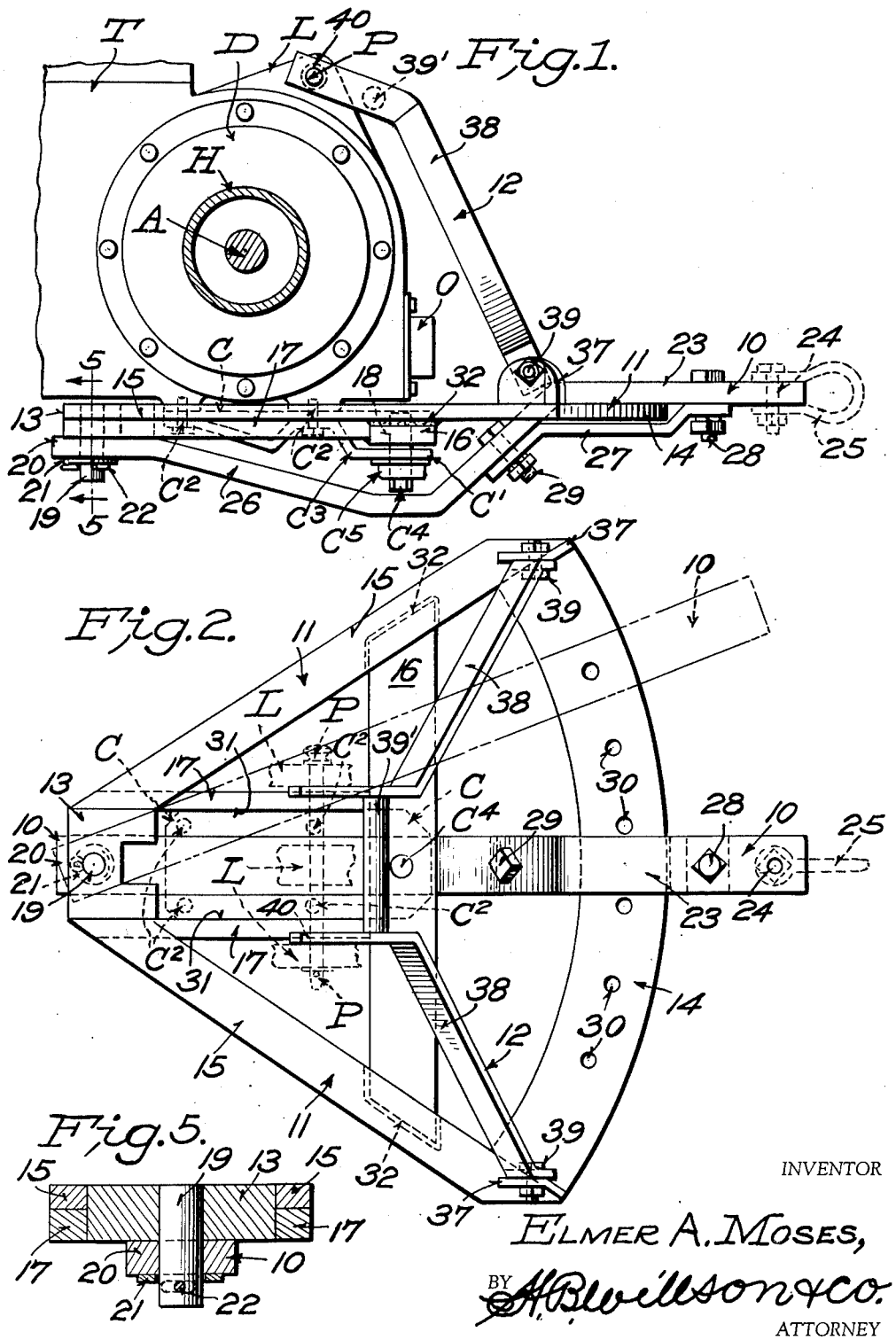

2,622,890

UNITED STATES PATENT OFFICE 2,622,890

SWINGING DRAWBAR HITCH AND STANDARDIZING UNIT

Elmer A. Moses, Pawnee, Ill.

Application August 24, 1951, Serial No. 243,503

3 Claims. (Cl. 280—33.12)

My invention relates to hitches for connecting agricultural implements or other loads to tractors, and more particularly to those of the swinging drawbar type which will permit of the attachment of various kinds and sizes of implements and machines without interfering with the use of the usual power take-off of the tractor.

The invention is especially intended for use on the well known Fordson and Ferguson tractors which usually have as standard equipment a clevis pin and plate unit mounted on the bottom of the differential housing for the attachment of agricultural machines or drawbars for the same, as disclosed for example E. V. Bunting Patent No. 2,506,773 May 9, 1950. Such a clevis attachment permits of the quick and easy mounting and removal of the drawbar assembly by a person standing at the rear of the tractor.

It has long been known that if the pivotal mounting of a swinging drawbar is disposed in front of the rear axle of the tractor certain advantages are obtained over a pivotal mounting located in the rear of the axle. Not only is there less likelihood of the front of the tractor lifting up and turning over when a heavy load is being drawn, but the steering of the tractor is facilitated and shorter turns of the tractor and the machine drawn by it may be made at the ends of the rows of plants in a field or at other places.

While both of these desirable features of hitch mechanisms of the pivoted drawbar type, have long been known, they have not to my knowledge been combined by others in a simple and practical device which will permit of the attachment to the tractor of all kinds of implements and machines whether or not the power take-off of the tractor is simultaneously used. It is therefore the object of my invention to provide an improved drawbar assembly, which will place the pull at the right distance in front of the rear axle without having any part of the forward end of the assembly or unit fastened directly to the tractor at an inaccessable place on its body and any part of the device interfering with the use of the power take-off, and which may be quickly and easily attached to or removed from the standard clevis by a person standing at the rear of the tractor.

With the above and other objects and advantages in view, the invention resides in the novel combinations and arrangements of parts and the novel features of construction hereinafter described and claimed, and illustrated in the accompanying drawings which show the present preferred embodiment of the invention.

In the drawings:

Fig. 1 is a side elevation of my improved hitch showing it applied, some of the tractor parts being shown in section;

Fig. 2 is a top plan view of the device, showing the drawbar in its normal central position in full lines and swung to one side in dotted lines, some parts of the tractor being shown in dotted lines;

Fig. 3 is an inverted or bottom plan view of the hitch, the strut member being omitted;

Fig. 4 is a perspective view of a slightly modified form of the hitch; and

Fig. 5 is a detail sectional view on line 5—5 in Fig. 1.

Referring more particularly to the drawings, the letter T represents a portion of the tractor which has at its rear a differential housing D centered in a housing H for the rear axle A. At the rear portion of the top of the differential housing are three spaced and transversedly alined lugs L apertured to receive a removable pin P which is normally used for the attachment of parts of implements or devices used with the tractor. The differential housing is also provided at the center of its rear side with a power take-off housing O; and on its bottom is a clevis generally designated by the letter C. This clevis which comes as standard equipment on the Fordson tractor and may be applied to the Ferguson tractor, consists of upper and lower plates C and C' which are generally rectangular in outline and which are fastened to the bottom of the housing D by four bolts $C^2$. The upper plate C is flat but the lower plate C' has at least its rear portion downwardly offset, as at $C^3$, from the rear portion of the upper plate for the reception of a drawbar, tongue or other part used for pulling an implement or other load. These spaced rear portions of the plates C, C' are formed with vertically alined openings to receive a removable clevis pin $C^4$ which is upwardly inserted in the alined openings and in the tongue or other element held by the pin between the two clevis plates. Suitable coacting means, generally indicated at $C^5$, on the pin $C^4$ and the lower plate C' are provided for detachably locking the clevis pin in its operative position. The above described parts are shown in the said Bunting Patent 2,506,773 in which the clevis pin is used both for pivotally mounting the drawbar and for attaching the drawbar guide to the tractor.

My improved hitch comprises a drawbar 10, a supporting and guiding frame or unit therefor, generally indicated by the numeral 11, and a suitable bracing or strut means 12. The unit 11 is of generally triangular shape and is disposed horizontally beneath the differential housing so as to project rearwardly therefrom as shown in Fig. 1. The unit comprises a short front plate 13, an arcuate rear plate 14, a pair of forwardly converging side plates or legs 15 extending from the ends of the plate 14 to the opposite side edges or ends of the plate 13, an intermediate cross plate 16 disposed between the front and rear plates and connected at its ends to the legs 15 and a pair of horizontally spaced, longitudinally extending, parallel abutment bars 17 having their rear ends connected to the cross plate or bar 16 and their front ends connected to opposite sides or ends of the front plate 13. These parts are welded together or otherwise fastened to provide a rigid unitary frame or unit on which the drawbar is mounted and supported so that it extends longitudinally in the center line of the draft of the tractor but may swing horizontally to either side.

The cross bar or plate 16 has a thickness which will permit it to be easily inserted between the spaced rear end portions of the clevis plates C, C¹, and it has a central hole 18 to receive the clevis pin C⁴. The front member or plate 13 is rigidly spaced forward of the cross plate 16 by the legs 15 and bars 17, a distance sufficient to dispose it in front of the rear axle A. The plate 13 carries at its center a pivot 19 on which the drawbar 10 swings. The pivot may be in the form of a pin having its upper end fixed in the plate 13 and its lower end extending through a hole in the flat horizontally disposed front end portion 20 of the drawbar. The end 20 may be retained on the pivot pin against the bottom of the plate 13 by a washer 21 and cotter pin 22.

The drawbar also has a flat horizontally disposed rear end portion 23 which is supported on the top of the arcuate rear plate or quadrant 14 and extends rearwardly beyond the latter for suitable connection with the trailing implement or other load to be pulled by the tractor. The end 23 may be provided with an aperture 24 for the connection of the usual clevis loop 25 shown in dotted lines in Figs. 1 and 2, but the trailing load may be either rigidly or pivotally connected to the drawbar in any desired manner. The drawbar intermediate its straight front and rear end portions 20, 23 is downwardly offset as at 26 so that it will clear the tractor clevis C. To retain the rear portion of the drawbar in sliding contact with the rear plate or quadrant 14, a retaining strap 27 extends across the bottom of the latter and has its ends secured by bolts 28 and 29 to the bottom of the drawbar as seen in Fig 1. The curvature of the plate or quadrant 14 is concentric with the pivot 19 so that the rear portion of the drawbar will be effectively supported in all of the angular positions of the drawbar. In order to hold the drawbar against swinging movement or in any selected angular position according to the draft requirement of a particular trailed implement, an arcuate series of apertures or holes 30 may be formed in the plate 14 to receive one or more locking pins (not shown).

The bars 17 not only assist the legs 15 in providing a rigid support for the front plate 13 which carries the drawbar pivot 19, but they are so positioned that their opposed inner edges form shoulders 31 which abut the parallel outer edges of one or the other or both of the rectangular clevis plates C, C¹ as will be seen on reference to Figs. 1 and 2. The unit 11 will thus be prevented from turning or rotating on the clevis pin C⁴. Since the space between the bars 17 is only slightly greater than the width of the clevis plates, these parts will assist the user in alining the hole 18 with the clevis pin when the unit is applied to the clevis by a person standing at the rear of the tractor. The bars 17 may be disposed either on the underside of the unit as shown in Figs. 1 and 2 or on its upper side as shown in the modification illustrated in Fig. 4. In both forms the front plate or block 13 has a height or vertical thickness equal to the combined thicknesses of the legs 15 and bars 17, these parts being welded to the outer side edges of the plate; and in both forms the legs 15 are disposed in the same plane as the rear plate or quadrant 14. In the first form Figs. 1 and 2 the intermediate cross bar or plate 16 is disposed in a plane below that of the parts 15, 14 and has its ends welded to the bottoms of the legs 15 as indicated at 32 in Fig. 2, while the rear ends of the bars 17 are welded as at 33 to the forward edge of the cross bar 16. In the modified form Fig. 4 the cross bar 16¹ is disposed in the plane of the legs 15¹ and the rear bar 14¹ and has its ends welded as at 34 to the inner edges of the legs, while the abutment bars 17¹ overlie the upper side of the cross bar 16¹ and are welded thereto as at 35. Between these welded ends of the bars 17¹, I preferably weld a short connecting bar 36. In all other respects the construction and operation of the form shown in Fig. 4 is the same as the first form.

The bracing or strut means 12 aids the tractor clevis in sustaining the weight of the hitch and may take many forms. Preferably two upstanding apertured ears or brackets 37 are welded to the top of the unit at or near the juncture of the legs 15 with the arcuate rear bar 14, and two metal straps 38 have their lower ends connected by bolts 39 to the ears. The upper ends of the braces or struts 38 may be fastened to stabilizer brackets on each side of the upper portion of the tractor, but as shown the parts are bent to converge upwardly and have apertured upper end portions spaced apart by a rigid connecting rod 39¹. The apertures 40 in the upper ends of the struts are adapted to receive the pin P which passes through the spaced lugs L on the upper part of the differential housing.

After numerous tests I have found that for the wheelbase of the Fordson and Ferguson tractors, which are now commonly called Ford tractors, the drawbar pivot 19 should be disposed about eight inches in front of the center of the rear axle in order to obtain the correct pull so that the trailing vehicle or load will pull the front end of the tractor around in making a turn. By mounting the unit 11 in the tractor clevis the trailing end of the drawbar is disposed thirteen inches from the ground and by extending the length of the drawbar its trailing end will have a swing of twenty-eight inches and will be disposed about fourteen inches from the power take-off shaft of the tractor. Hence the tractor will be standardized for power take-off tools when the hitch is on the tractor. By extending the forward part of the unit 11 the correct distance in front of the intermediate cross bar 16 and pivotally mounting the drawbar on such extended front end, the device may be easily and quickly applied to the standard clevis on the tractor by a person standing at the rear of the differential, and it is not necessary to get under the tractor to pivotally mount the drawbar in front of the rear axle.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. In a hitch mechanism for a tractor having a differential housing with a clevis mounted on the underside of the housing and extending rearwardly, the clevis having vertically spaced plates apertured to receive a removable clevis pin, the combination of a drawbar, a drawbar supporting and guiding unit for horizontal disposition beneath the differential and for mounting on the tractor clevis, said unit having between its front and rear ends an apertured plate for mounting in the clevis, the front end of said unit being disposed in front of the rear axle of the tractor when the unit is mounted in the clevis, a pivot positioned centrally at the front end of the unit to pivotally support the front end of the drawbar beneath said front end of the unit and in front of the rear axle, said drawbar having its intermediate portion downwardly offset to clear the clevis and also having its rear end portion guidingly supported by the rear end of the unit, means forming a part of said unit and engageable with the opposite edges of at least one of the clevis plates for preventing said unit from rotating on said pivot, and strut means connected to the rear of said unit for connection to an upper portion of the tractor when said unit is connected to the tractor clevis.

2. In a hitch mechanism for a tractor having a differential housing with a clevis mounted on the underside of the housing and extending rearwardly, the clevis having upper and lower plates with parallel side edges and with their rear portions spaced apart and apertured to receive a removable clevis pin, the combination of a drawbar, a drawbar supporting and guiding unit for horizontal disposition beneath the differential and for mounting on the tractor clevis, said unit comprising connected front, rear and intermediate plates, the intermediate plate being insertable between the clevis plates and being apertured to receive the clevis pin, said front plate being disposed in front of the rear axle of the tractor when said intermediate plate is mounted in the clevis, a pivot carried by said front plate for mounting the front end of said drawbar on the underside of said front plate and in front of the rear axle, said rear plate being of arcuate form concentric with said pivot, said drawbar having its intermediate portion downwardly offset to clear the clevis and its rear portion guidingly supported on said arcuate rear plate, stop shoulders carried by said unit to engage the side edges of at least one of said clevis plates to prevent rotation of the unit on said pivot, and strut means connected to the rear portion of said unit for connection to an upper portion of the tractor when said unit is connected to the tractor clevis.

3. In a hitch mechanism for a tractor having a differential housing with a clevis mounted on the underside of the housing and extending rearwardly, the clevis having upper and lower plates with parallel side edges and with their rear portions spaced apart and apertured to receive a removable clevis pin, the combination of a drawbar, a drawbar supporting and guiding unit for horizontal disposition beneath the differential and for mounting on the tractor clevis, said unit comprising a front plate, an arcuate rear plate, a pair of forwardly converging legs extending from the end of the arcuate plate to the opposite side edges of the front plate, a cross plate intermediate said front and rear plates and having its ends connected to said legs, and a pair of horizontally-spaced, longitudinally-extending, parallel abutment bars connected at their forward ends with the end portions of said front plate and at their rear ends with said cross plate, the latter being insertable between the spaced rear ends of the clevis plates and having a central opening to receive the clevis pin, said abutment bars having their opposed edges disposed for bearing contact with the parallel side edges of at least one of said clevis plates, said front plate being spaced forwardly from said cross plate a distance to position it in front of the rear axle of the tractor when said cross plate is held by the clevis pin between the spaced rear portions of the clevis plates, a pivot for the front end of said drawbar disposed in front of the rear axle and positioned centrally in said front plate, the rear portion of said drawbar being slidably supported on said arcuate rear plate, and the intermediate portion of said drawbar being downwardly offset to clear the tractor clevis, and strut means connected to the rear portion of said unit for connection to an upper rear portion of the tractor when said unit is connected to the tractor clevis.

ELMER A. MOSES.

REFERENCES CITED

The following references are of record in the file of this patent:

UNITED STATES PATENTS

| Number | Name | Date |
| --- | --- | --- |
| 1,852,537 | Paul | Apr. 5, 1932 |
| 2,506,773 | Bunting | May 9, 1950 |